United States Patent
Putnam

(10) Patent No.: US 12,270,175 B2
(45) Date of Patent: Apr. 8, 2025

(54) VENTED PRECIPITATION GUARDING MANHOLE COVER ASSEMBLY

(71) Applicant: SEWER SENTRY LLC, Calhoun, LA (US)

(72) Inventor: David Alan Putnam, West Monroe, LA (US)

(73) Assignee: SEWER SENTRY LLC, Calhoun, LA (US)

( * ) Notice: Subject to any disclaimer, the term of this patent is extended or adjusted under 35 U.S.C. 154(b) by 824 days.

(21) Appl. No.: 17/497,690

(22) Filed: Oct. 8, 2021

(65) Prior Publication Data

US 2022/0112678 A1 Apr. 14, 2022

Related U.S. Application Data

(60) Provisional application No. 63/091,772, filed on Oct. 14, 2020.

(51) Int. Cl.
*E02D 29/14* (2006.01)

(52) U.S. Cl.
CPC .................. *E02D 29/1436* (2013.01)

(58) Field of Classification Search
CPC ............... E02D 29/14; E02D 29/1436
USPC ......................... 404/25; 52/19, 20
See application file for complete search history.

(56) References Cited

U.S. PATENT DOCUMENTS

| | | | |
|---|---|---|---|
| 193,605 A | 7/1877 | Hay | |
| 574,992 A | 1/1897 | Held | |
| 576,253 A | 2/1897 | Bingham | |
| 1,469,790 A * | 10/1923 | Hysko | E03F 5/042 137/247.23 |
| 2,009,132 A | 7/1935 | Gehris | |
| 2,026,788 A * | 1/1936 | Kirby | F02M 1/16 261/50.1 |
| 3,530,882 A * | 9/1970 | Case | F16K 24/00 137/202 |

(Continued)

FOREIGN PATENT DOCUMENTS

| | | |
|---|---|---|
| DE | 69 44 309 U | 6/1970 |
| DE | 36 37 493 A1 | 5/1988 |

(Continued)

OTHER PUBLICATIONS

International Search Report and Written Opinion for International Patent Application PCT/US22/53535 dated May 25, 2023.

(Continued)

*Primary Examiner* — Raymond W Addie
(74) *Attorney, Agent, or Firm* — Foley & Lardner LLP

(57) ABSTRACT

A vented precipitation guarding manhole cover assembly, comprising: a manhole cover having a top exterior surface and a bottom interior surface; a vent opening extending through the manhole cover between the top and bottom surfaces; a valve assembly in fluid communication with the vent opening and extending from the bottom interior surface, the valve assembly configured to extend from the bottom interior surface at least partially inside the manhole, the valve assembly operable between an open position, to enable gas to exit from the manhole, and a closed position, to prevent the flow of fluid from the top exterior surface into the manhole.

17 Claims, 3 Drawing Sheets

(56) References Cited

U.S. PATENT DOCUMENTS

| | | | |
|---|---|---|---|
| 3,712,009 A * | 1/1973 | Campagna | E02D 29/14 |
| | | | 52/198 |
| 3,798,848 A * | 3/1974 | Campagna | E02D 29/14 |
| | | | 52/198 |
| 3,920,347 A | 11/1975 | Sauriol et al. | |
| 3,953,554 A * | 4/1976 | Loughridge | B01F 23/2312 |
| | | | 261/DIG. 70 |
| 3,973,856 A | 8/1976 | Gaglioti | |
| 4,067,659 A | 1/1978 | Campagna et al. | |
| 4,069,840 A | 1/1978 | Brown et al. | |
| 4,103,901 A | 8/1978 | Ditcher | |
| 4,305,679 A | 12/1981 | Modi | |
| 4,440,407 A | 4/1984 | Gagas | |
| 4,475,571 A | 10/1984 | Houston, Jr. et al. | |
| 4,501,292 A | 2/1985 | Maloblocki | |
| 4,512,492 A * | 4/1985 | Graybeal | E02D 29/14 |
| | | | 220/203.28 |
| 4,586,941 A | 5/1986 | Cooley | |
| 4,597,692 A * | 7/1986 | Gruenwald | E02D 29/149 |
| | | | 220/789 |
| 4,650,365 A * | 3/1987 | Runnels | E02D 29/14 |
| | | | 404/26 |
| 4,687,023 A | 8/1987 | Harbison et al. | |
| 4,762,440 A | 8/1988 | Argandona | |
| 4,768,675 A | 9/1988 | Coleman | |
| 4,834,574 A | 5/1989 | Bowman | |
| 4,919,564 A | 4/1990 | Neathery et al. | |
| 5,062,735 A | 11/1991 | Gaudin | |
| 5,401,114 A | 3/1995 | Guggemos | |
| 5,727,351 A | 3/1998 | Neathery et al. | |
| 5,846,274 A | 12/1998 | Smelser | |
| 5,924,846 A | 7/1999 | Arnold et al. | |
| 6,161,984 A | 12/2000 | Sinclair | |
| 6,510,869 B1 | 1/2003 | Ouchi et al. | |
| 6,514,008 B1 | 2/2003 | Smolnik | |
| 6,616,370 B1 * | 9/2003 | Signorelli | E02D 29/14 |
| | | | 404/25 |
| 6,848,465 B1 | 2/2005 | Ledbetter | |
| 7,798,742 B2 | 9/2010 | Nolle et al. | |
| 7,849,617 B2 | 12/2010 | Intagliata et al. | |
| 7,883,290 B1 * | 2/2011 | Ross | E02D 29/1427 |
| | | | 210/163 |
| 8,851,789 B2 | 10/2014 | Bax | |
| 8,851,791 B1 | 10/2014 | Putnam | |
| 9,091,367 B2 | 7/2015 | Waldor | |
| 9,605,403 B1 | 3/2017 | Putnam | |
| 9,695,569 B1 * | 7/2017 | Knowles | E02D 29/1436 |
| 9,784,650 B1 | 10/2017 | Neathery | |
| 11,118,323 B1 | 9/2021 | Putnam | |
| 11,536,003 B1 | 12/2022 | Forlong et al. | |
| 2008/0105306 A1* | 5/2008 | Takai | E04D 13/08 |
| | | | 137/511 |
| 2009/0223574 A1 | 9/2009 | Montague | |
| 2012/0048401 A1 | 3/2012 | Yamashita et al. | |
| 2012/0227168 A1* | 9/2012 | Paoluccio | E03C 1/1225 |
| | | | 4/220 |
| 2013/0089373 A1 | 4/2013 | Bax | |
| 2014/0137949 A1 | 5/2014 | Montague | |
| 2016/0356522 A1 | 12/2016 | Bertini et al. | |
| 2023/0265637 A1 | 8/2023 | Putnam | |

FOREIGN PATENT DOCUMENTS

| | | |
|---|---|---|
| DE | 10 2006 054 343 B3 | 1/2008 |
| DE | 10 2006 045 873 A1 | 4/2008 |
| EP | 1 655 416 A2 | 5/2006 |
| KR | 20110093249 A | 8/2011 |
| WO | WO-92/09753 A1 | 6/1992 |
| WO | WO-2018/143963 | 8/2018 |

OTHER PUBLICATIONS

Stainless Steel Sanitary Tubing—5 Foot Lengths. Datasheet [online], Buy Fittings Online, 6-7, Oct. 25, 2021 [retrieved Mar. 17, 2023]. Entire Document. Retrieved from the Internet: https://www.buyfittingsonline.com/stainless-steel-sanitary-tubing-5-ft-length-pre-cut/.

International Search Report and Written Opinion for International Patent Application No. PCT/US2021/054279 dated Jan. 19, 2022.

Gromicko, Nick and Will Decker. "Standpipes." NAHI, InterNACHI, Aug. 22, 2010. Web. https//www.nachi.org/standpipes.htm.

International Search Report dated Apr. 28, 2017 in PCT/US2017/15908, 3 pages.

International Search Report and Written Opinion for International Patent Application No. PCT/US2021/049918 DTD Dec. 22, 2021.

International Search Report and Written Opinion in PCT/US2024/027031 dated Aug. 28, 2024.

Extended European Search Report on EP Patent Application No. 21880825.1 DTD Oct. 22, 2024, 12 pgs.

* cited by examiner

VENTED PRECIPITATION GUARDING MANHOLE COVER ASSEMBLY

CROSS REFERENCE TO RELATED APPLICATION

This application claims the benefit of and priority to U.S. Provisional Patent Application Ser. No. 63/091,772 filed on Oct. 14, 2020, entitled "VENTED PRECIPITATION GUARDING MANHOLE COVER ASSEMBLY," the entirety of which is incorporated herein by reference for any and all purposes.

TECHNICAL FIELD

This disclosure relates to manhole covers for manhole openings that overlie sewer systems. More particularly, this disclosure relates to vented precipitation guarding manhole cover assemblies that close a manhole opening in a manhole structure above a sanitary sewer while venting sewer gas as well as prevent or limit flow of precipitation into and overflow of storm water from the sewer.

BACKGROUND OF THE DISCLOSURE

The background description provided herein is solely for the purpose of generally presenting the context of the illustrative embodiments of the disclosure. Aspects of the background description are neither expressly nor impliedly admitted as prior art against the claimed subject matter.

Sanitary sewers are subterranean tunnels, which transport raw sewage from houses and commercial buildings to a treatment or disposal facility. Sewers may include pipelines, which connect houses and buildings to one or more levels of larger underground trunk mains. Manholes are periodically-shaped vertical openings which connect the trunk mains to the ground surface for sewer gas venting and other purposes. Manhole covers are plates, which are seated in manhole openings at the ground surface to close the manholes. The manhole covers can be selectively unseated from the manhole openings to provide access to the underlying subterranean sewer structure for cleaning, maintenance, or repair.

Vented precipitation guarding manhole cover assemblies, which close a manhole opening in a manhole structure above a sanitary sewer and vent sewer gas from the sewer as well as prevent or limit flow of precipitation into and overflow of storm water from the sewer, may be desirable for some applications.

SUMMARY

According to a first embodiment, a vented precipitation guarding manhole cover assembly is provided. The assembly includes a manhole cover having a top exterior surface and a bottom interior surface and a vent opening extending through the manhole cover between the top and bottom surfaces. A valve assembly is provided and it is in fluid communication with the vent opening. The valve assembly extends from the bottom interior surface; also, the valve assembly is configured to extend from the bottom interior surface at least partially inside a manhole. The valve assembly is operable between an open position, to enable gas to exit from the manhole, and a closed position, to prevent a flow of a fluid from the top exterior surface into the manhole.

In some embodiments, the valve assembly is formed having a valve body having a top surface, a bottom surface, and a side surface extending between the top and bottom surfaces. A first opening is formed on the top surface and a second opening formed on the side surface. A fluid passageway extending between the first and second openings and wherein, when the valve assembly is in the open position, gases within the manhole enter through the second opening and exit through the first opening, and, when in the closed position, the fluid is prevented from entering the manhole through the first opening.

In other embodiments, the valve assembly includes a first passage extending from the first opening and a second passage extending from the second opening and angularly intersecting the first passage. In response to the fluid at least partially filling the first passage, a valve member moves to the closed position to prevent the fluid from passing through the second passage.

In yet other embodiments, the valve member is a ball.

In still other embodiments, wherein the valve assembly is a check valve.

In still another embodiment, the first passage is threaded to threadably secure the valve body to the manhole cover.

In other embodiments, the top exterior surface further comprises a protrusion extending from the top exterior surface, the vent opening extending through the protrusion.

In yet another embodiment, the protrusion is removably attachable to the manhole cover.

According to a second aspect, a valve assembly for use with and extending from an underside of a vented manhole cover assembly is provided. The valve assembly is operable between an open position, to enable gas to exit from the manhole, and a closed position, to prevent the flow of fluid into the manhole. The valve assembly includes a valve body having a first opening and a second opening and a fluid passage extending between the first and second openings. A valve member is included and it is moveable between the open position and the closed position, such that in response to fluid entering through the first opening, the valve member moves from the open position to the closed position to prevent the flow of the fluid into the manhole.

According to one embodiment, the valve body includes a top surface, a bottom surface and a side surface extending between the top and bottom surfaces. A first opening is formed on the top surface and the second opening formed on the side surface, the fluid passage formed including a first fluid passage extending from the first opening and a second fluid passage extending from the second opening, the second fluid passage intersecting the first fluid passage at an angle. When the valve assembly is in the open position, gases within the manhole enter through the second opening and exit through the first opening, and, when in the closed position, the fluid is prevented from entering the manhole through the first openings.

According to yet another embodiment, the valve body is threadably secured to the manhole cover.

In still another embodiment, the valve body is welded to the manhole cover.

In still another embodiment, the valve member is a check valve.

According to some embodiments, the valve assembly further includes a manhole cover protrusion and a stem extending from the manhole cover protrusion, the stem sized to fit within and through the vent opening of the manhole cover. The stem is configured to attach to the valve body such that when the stem is disposed within the vent opening, the valve body is aligned with the vent opening and secured to the manhole cover.

According to a third aspect, there is provided a method of forming a vented precipitation guarding manhole cover assembly. The method includes forming a vent opening through a manhole cover between top and bottom surfaces of the manhole cover. The method also includes providing a valve assembly, the valve assembly operable between an open position, to enable gas to exit from a manhole and through the manhole cover, and a closed position, to prevent the flow of a fluid from the top surface through the manhole cover into the manhole. The method further includes securing the valve assembly to the manhole cover such that the valve assembly extends from the bottom surface and into the manhole when the manhole cover is positioned to enclose the manhole.

According to some embodiments, providing the valve assembly includes providing a valve body including a valve body having a top surface, a bottom surface, and a side surface extending between the top and bottom surfaces, a first opening formed on the top surface and a second opening formed on the side surface, and a fluid passageway extending between the first and second openings such that, when the valve assembly is in the open position, gases within the manhole enter through the first opening and exit through the second opening, and, when in the closed position, the fluid is prevented from entering the manhole through the first opening.

According to some embodiments, wherein securing the valve assembly to the manhole cover includes aligning the first opening with the vent opening.

In yet other embodiments, wherein securing the valve assembly to the manhole cover includes threadably securing the valve assembly to the manhole cover.

In still other embodiments, the method further includes providing a protrusion member and securing the protrusion member to the manhole cover such that it extends from the top surface and a vent opening in the protrusion member is aligned with the vent opening of the manhole cover.

In other embodiments, providing the protrusion member includes providing a stem extending from the protrusion member, the stem sized to fit within and extend through the manhole cover vent opening, the method further including securing the valve assembly to the stem.

DESCRIPTION OF THE FIGURES

The accompanying drawings facilitate an understanding of the various embodiments.

Like elements are labeled using like numerals.

DETAILED DESCRIPTION

Figure 1:
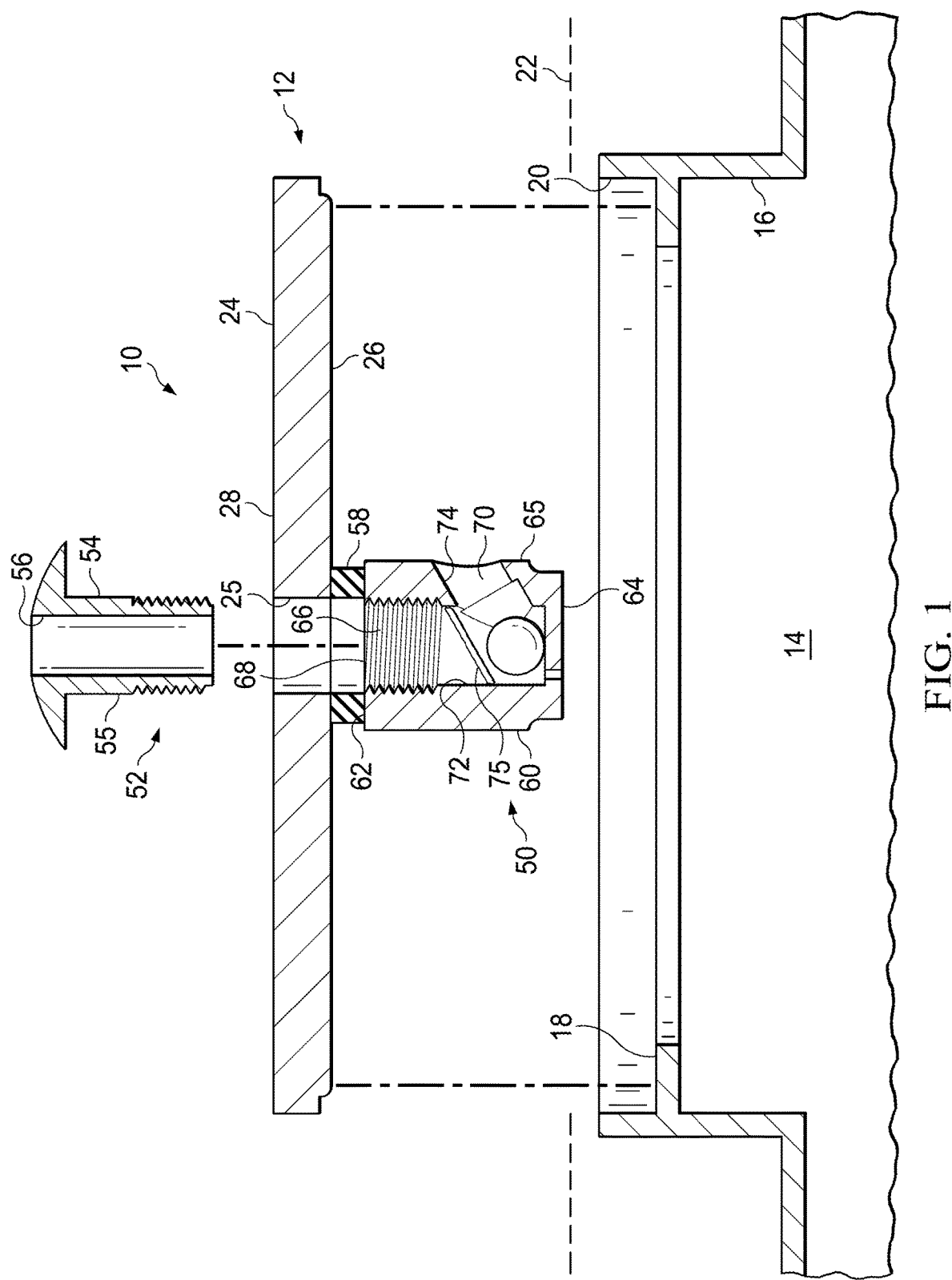
FIG. 1 is an illustration of an exploded view of a vented precipitation guarding manhole cover assembly in which a valve assembly is secured to the manhole cover.
Figure 2:
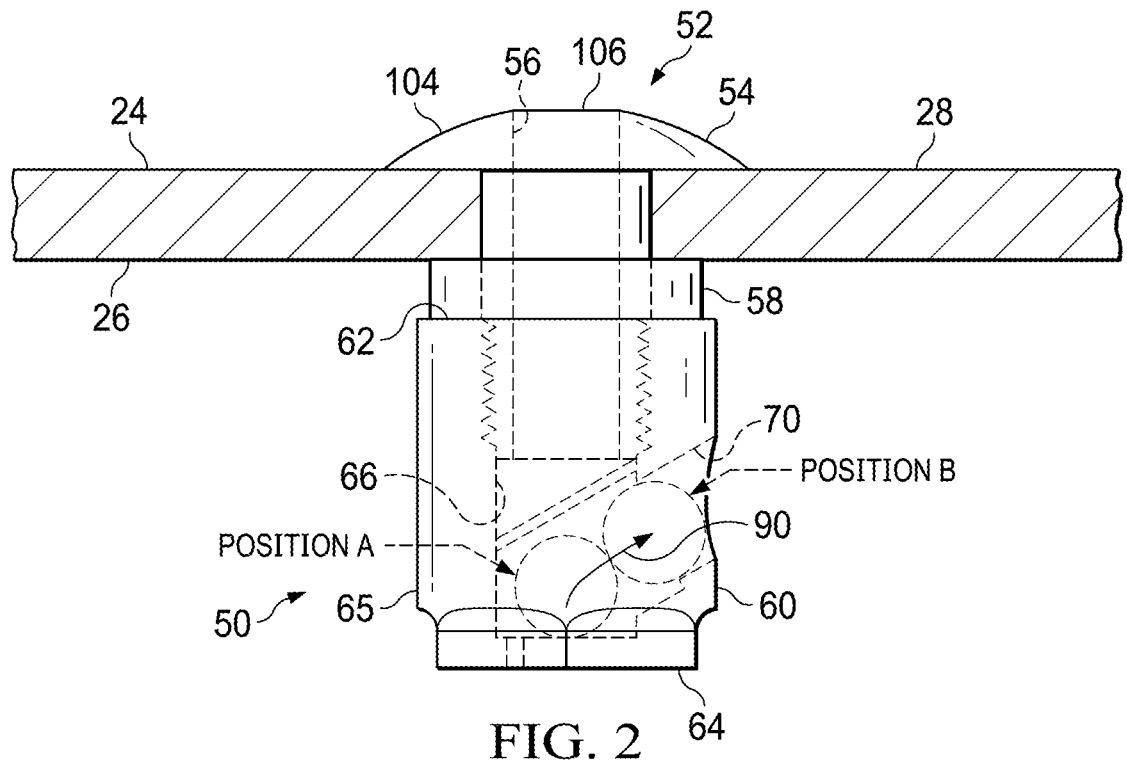
FIG. 2 is an illustration of the vented precipitation guarding manhole cover assembly of FIG. 1.

Referring to FIGS. 1 and 2, an embodiment of a vented precipitation guarding manhole cover assembly 10 is illustrated, in which a manhole cover assembly 12 is employed to vent sewer gases from a sewer 14 as well as prevent or limit flow of precipitation into and overflow of storm water from the sewer 14. In the embodiment illustrated in FIGS. 1 and 2, the manhole cover assembly 12 is configured to be mounted and/or otherwise secured in a manhole 16 having a manhole shoulder 18 formed in a manhole opening 20. In some applications, the manhole 16 may extend into the ground or a roadway surface 22 and communicates with a sanitary sewer 14 beneath the ground or roadway surface 22. In operation and as discussed in more detail below, the manhole cover assembly 12 vents or otherwise discharges the sewer gas such as, for example, hydrogen sulfide and mercaptan, from the sewer 14 to the atmosphere. In addition, the manhole cover assembly 12 prevents or substantially limits the quantity of falling precipitation from the atmosphere and/or pooled precipitation from the ground or roadway surface 22 from entering the sewer 14 through the manhole opening 20. The manhole cover assembly 12 may further prevent storm water from rising from the sewer 14, overflowing through the manhole opening 20 and flooding or contaminating the ground or roadway surface 22, particularly under heavy precipitation conditions.

Referring specifically to the embodiment illustrated in FIG. 1, the manhole cover assembly 12 includes a manhole cover 24. The manhole cover 24 may include steel, aluminum, carbon fiber composite, inert plastic or other suitable material, or any combination thereof. As illustrated in FIG. 1, the manhole cover 24 has an interior manhole cover surface 26, which faces the sewer 14, a generally planar exterior manhole cover surface 28, which faces the atmosphere, and an annular manhole cover edge 30, which circumscribes the interior manhole cover surface 26 and the exterior manhole cover surface 28 and faces the manhole structure 16 when the manhole cover 24 is seated on the manhole shoulder 18.

With continued reference to FIGS. 1 and 2 and as described in greater detail below, a valve assembly 50 is secured to and/or otherwise abuts the interior manhole surface 26 to extend at least partially within the manhole 16. In FIGS. 1 and 2, the valve assembly 50 is secured via a venting assembly 52, which includes a threaded bolt 54 having a stem 55 and an interior venting passageway 56 therethrough and optionally includes at least one washer 58 disposed between the manhole cover 24 and the valve assembly 50. When installed on the manhole cover 24, the valve assembly 50 extends from the interior manhole surface 26 and at least partially into the manhole 16 to vent gas buildup in the sewer 14 while also preventing fluids such as rainwater that collects on the roadway surface 22 from entering the manhole 16.

Figure 3:
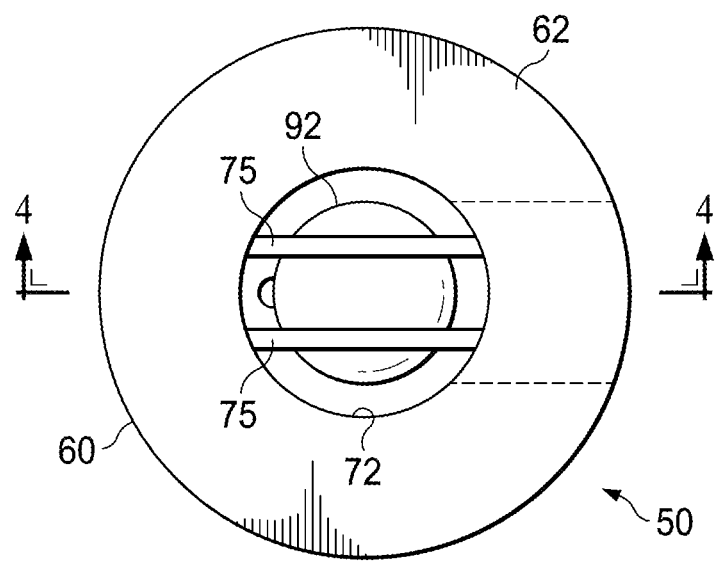
FIG. 3 is an illustration of a top view of the valve assembly of FIGS. 1 and 2 taken without the manhole cover.
Figure 4:
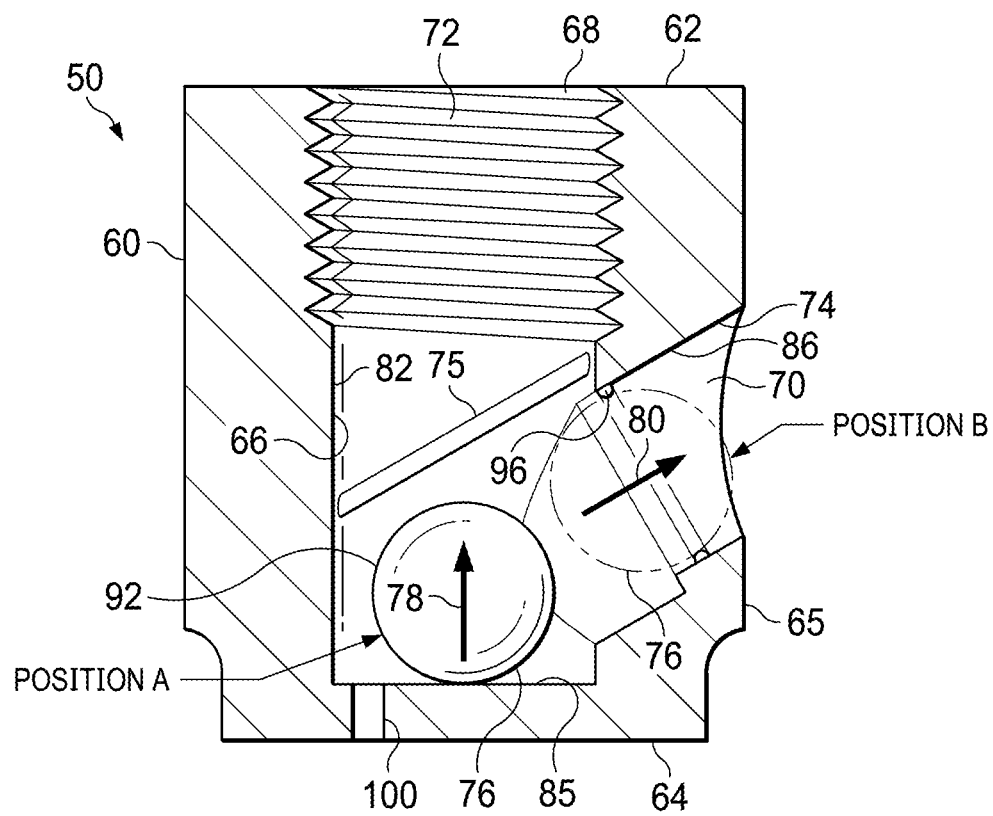
FIG. 4 is a section view of the valve assembly of FIGS. 1-3 taken along the line 4-4 of FIG. 3 illustrating the valve between the open and closed positions.
Figure 5:
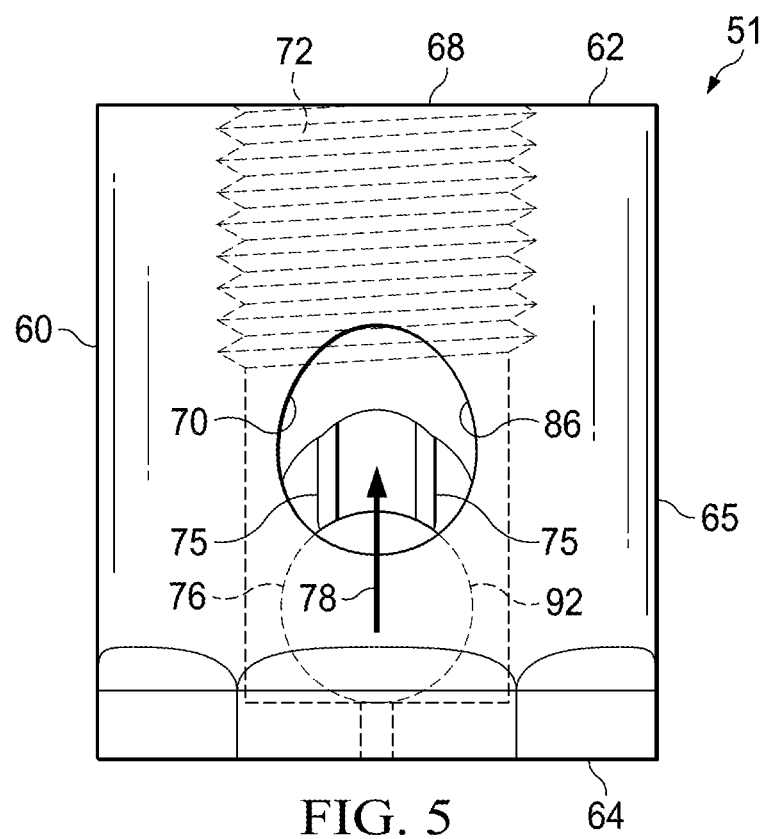
FIG. 5 a side view of the valve assembly.

Referring now to FIGS. 3-5, the valve assembly 50 includes a valve body 60 having a first or top surface 62, an opposed second or bottom surface 64 and a side surface 65 extending between the first and second surfaces 62 and 64. As illustrated in the embodiment of FIGS. 3-5, the valve body 60 includes an interior passage 66 formed having a fluid passageway extending between a first opening 68 and second opening 70 such that, as described in greater detail below, when the valve assembly 50 is in the open position, gases within the sewer 14 enter the second opening 70 and exit the valve assembly 50 through the top or first opening 68. When the valve assembly 50 is in the closed position, precipitation or other fluid buildup on the ground or roadway surface 22 is prevented from entering the manhole 16 through the manhole opening 20.

Referring specifically to FIG. 4, the valve assembly 50, and in particular, the passage 66 includes a first passage 72 extending from the first/top opening 68 and a second passage 74 extending from the second/bottom opening 70. In the embodiment illustrated in FIG. 4, the first and second passages 72 and 74 angularly intersect at a predetermined angle θ such that and as explained in greater detail below, in response to precipitation or other fluid at least partially filling the first passage 72, a valve member 76 moves upward in the direction of arrows 78 and 80 from the first passage 72, while the open position, and into the second passage 74 to rest in the closed position thereby preventing or otherwise substantially reducing the flow of fluid from passing through second passage 74 and into the sewer 14. In the embodiment illustrated in FIGS. 1-3, for example, a diverter member 75 is operable to direct the valve member 76 as it moves in the direction of arrow 78 toward the second passage 74. Referring specifically to FIG. 4, the diverter 75 includes a pair of guide pins spaced apart to prevent the valve member 76 from moving too far upward in the first passage 72 while at the same time directing the valve member 76 toward the second passage 74. It should be understood that different configurations of the diverter 75 may exist. For example, only a single guide pin can be used. Alternatively, the diverter 75 can be molded integrally into the valve body 60.

Referring specifically to FIGS. 3 and 4, the first passage 72 extends from the top surface 62 toward the second or bottom surface 64 and is formed having a sidewall 82 and a bottom wall 85. According to some embodiments, the sidewall 82 near and/or otherwise adjacent the top surface 62 contains a threaded portion 102 to threadably engage the threaded bolt 54 to secure the valve body 60 against the interior manhole surface 26. In FIGS. 3 and 4, the second passage 74 extends from the sidewall 65 toward the first passage 72 and is formed having a sidewall 86 and valve seat 96 to receive the valve member 76 in response to fluid buildup in the first passage 72. According to embodiments disclosed herein, the second passage 74 angularly extends from the first passage 72 at an angle θ between about 0 degrees and 90 degrees with respect to a longitudinal central axis of the first passage 72. For example, in some embodiments, the angle θ is about 45 degrees; however, the angle θ can be greater than 45 degrees and other instances, less than 45 degrees.

In the embodiment illustrated in FIGS. 1-5, the valve member 76 is a ball 92 such that when no fluid is inside the first passage 72, the ball 92 rests on and is supported by the bottom wall 85, as best illustrated in FIG. 4, generally designated as Position A. In FIG. 4, for example, the ball 92 has a diameter less than a diameter of the first passage 72 such that when rainwater or other fluid enters the first passage 72 through the venting passageway 56, the rainwater flows around and underneath the ball 92 thereby lifting the ball 92 in the direction of arrow 78 until the ball 92 contacts a diverter 94, which directs the ball 92 in the direction of arrow 90 and at least partially into the second passage 74, as illustrated in FIG. 4 as Position B. In particular, the ball 92 is formed of a material and/or otherwise designed such that the water pressure acting on the ball 92 moves the ball 92 in the direction of arrows 78 and 80 until it is seated against a valve seat 96 formed in the second passage sidewall 86 so that a seal is formed between the ball 92 and the valve seat 96 thereby preventing and/or substantially reducing the flow of fluid through the second passage 74. In normal operation, the pressure generated by the rainwater within the first passage 72 acting against the ball 92 is greater than the pressure within the sewer 14 acting on the ball 92 in so as to prevent the ball 92 from separating from the valve seat 96 and otherwise returning from the closed position (i.e., Position B) to the open position (i.e., Position A).

Referring specifically to FIGS. 4-6, the first passage 72 includes a drain hole 100 extending through the bottom wall 85. In operation, the drain hole 100 provides a passage for rainwater to exit the interior passage 66 such that, for example, when rainwater drains from the ground or roadway surface 22, any remaining fluid within the interior passage 66 slowly exits the drain hole 100. As the fluid level within the interior passage 66 is reduced, the ball 92 moves in the direction opposite of arrows 78 and 80 until it rests against the bottom wall 85 returning to the open position (Position A). When in the open position, any gaseous buildup within the sewer 14 will exit through the interior passage 66, through the venting passageway 56 into ambient air.

With specific reference to FIGS. 1 and 2, the valve assembly 50 is secured to and otherwise abuts the interior manhole surface 26 via the threaded bolt 54 securely engaging the corresponding threaded portion 102 within the first passage 72. However, it should be understood that other configurations may be used. For example, in some embodiments, the valve assembly 50 may be welded to the interior manhole surface 26, may be secured via an adhesive, secured with one or more bolts and/or brackets, not illustrated. In other embodiments, the valve assembly 50 may be integrally formed with the manhole cover 24. Furthermore, in other embodiments, a plurality of interior passages 66 and valve members 76 may extend through the valve body 60. In still other embodiments, instead of a valve member 76 responsive to the varying fluid level within the interior passage 66, the valve member 76 may be actuated in response to a signal received from a rain sensor (not illustrated). For example, the valve assembly 50 may include a controller (not illustrated) communicatively coupled to a sensor, such as, for example, a rain sensor or other sensor to detect precipitation or other fluids on the roadway 22. In response to receiving the signal, the controller is operable to send a signal to position the valve member 76 from the open positon (Position A) to the closed position (Position B). Likewise, when the sensor no longer detects rain or liquids on the roadway 22, the controller is operable to send a signal to position the valve member 76 from the closed position (Position B) to the open position (Position A).

In the embodiment illustrated in FIGS. 1 and 2, the threaded bolt 54 includes a rounded or dome shaped head portion 104 formed having apex 106 and sized to extend outward from the manhole cover exterior surface 28. In the event that falling precipitation forms pooled precipitation that accumulates or pools on the ground or roadway surface 22 and on the exterior manhole cover surface 28, the height above the apex 106 beyond the plane of the exterior manhole cover surface 28 on the ground or roadway surface 22 limits the quantity of pooled precipitation that can enter the sewer 14 by preventing the pooled precipitation from flowing into the valve assembly 50 until the depth of the pooled precipitation exceeds the height of the apex 106. Otherwise, the pooled precipitation tends to flow around rather than over the apex 106.

According to some embodiment disclosed herein, a method of forming a vented precipitation guarding manhole cover assembly 10 is provided. The method includes the step of forming a vent opening 25 through a manhole cover 24 that extends between the interior/bottom and exterior/top manhole surfaces 26 and 28. The method further includes providing a valve assembly 50, the valve assembly 50 being operable between an open position (Position A in FIG. 4), to enable gas to exit from the manhole 16 and through the manhole cover 24, and a closed position (Position B in FIG. 4), to prevent the flow of fluid from the exterior or top surface 28 through the manhole cover 24 into the manhole 16. The method also includes securing the valve assembly 50 to the manhole cover 24 such that the valve assembly 50 extends from the bottom or interior surface 26 and into the manhole 16 when the manhole cover 24 is positioned to enclose the manhole 16.

In the foregoing description of certain embodiments, specific terminology has been resorted to for the sake of clarity. However, the disclosure is not intended to be limited to the specific terms so selected, and it is to be understood that each specific term includes other technical equivalents, which operate in a similar manner to accomplish a similar technical purpose.

In the specification and claims, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A vented precipitation guarding manhole cover assembly, comprising:
    a manhole cover having a top exterior surface and a bottom interior surface;
    a vent opening extending through the manhole cover between the top and bottom surfaces;
    a valve assembly in fluid communication with the vent opening and extending from the bottom interior surface, the valve assembly configured to extend from the bottom interior surface at least partially inside a manhole, the valve assembly operable between an open position, to enable gas to exit from the manhole, and a closed position, to prevent a flow of a fluid from the top exterior surface into the manhole;
    wherein the valve assembly is formed having a valve body having a top surface, a bottom surface and a side surface extending between the top and bottom surfaces;
    a first opening formed on the top surface and a second opening formed on the side surface;
    a fluid passageway extending between the first and second openings; and
    wherein, when the valve assembly is in the open position, gases within the manhole enter through the first opening and exit through the second opening, and, when in the closed position, the fluid is prevented from entering the manhole through the first opening.

2. The valve assembly of claim 1, wherein the first passage is threaded to threadably secure the valve body to the manhole cover.

3. The valve assembly of claim 1 wherein the valve assembly includes a first passage extending from the first opening and a second passage extending from the second opening and angularly intersecting the first passage, wherein in response to the fluid at least partially filling the first passage, a valve member moves to the closed position to prevent the fluid from passing through the second passage.

4. The valve assembly of claim 3, wherein the valve member is a ball.

5. The valve assembly of claim 1, wherein the valve assembly is a check valve.

6. The valve assembly of claim 1, wherein the top exterior surface further comprises a protrusion extending from the top exterior surface, the vent opening extending through the protrusion.

7. The valve assembly of claim 6, wherein the protrusion is removably attachable to the manhole cover.

8. A valve assembly for use with and extending from an underside of a vented manhole cover assembly, the valve assembly operable between an open position, to enable gas to exit from the manhole, and a closed position, to prevent the flow of the fluid into the manhole, the valve assembly, comprising:
    a valve body having a top surface, a bottom surface, a side surface extending between the top and bottom surfaces, a first opening formed on the top surface, a second opening formed on the side surface, and a fluid passage extending between the first and second openings, the fluid passage formed including a first fluid passage extending from the first opening and a second fluid passage extending from the second opening, the second fluid passage intersecting the first fluid passage at an angle;
    a valve member moveable between the open position and the closed position, such that in response to the fluid entering through the first opening, the valve member moves from the open position to the closed position to prevent the flow of the fluid into the manhole; and
    wherein when the valve assembly is in the open position, gases within the manhole enter through the second opening and exit through the first opening, and when in the closed position, the fluid is prevented from entering the manhole through the first opening.

9. The valve assembly of claim 8, wherein the valve body is threadably secured to the manhole cover.

10. The valve assembly of claim 8, wherein the valve body is welded to the manhole cover.

11. The valve assembly of claim 8, wherein the valve member is a check valve.

12. The valve assembly of claim 8, further comprising a manhole cover protrusion and a stem extending from the manhole cover protrusion, the stem sized to fit within and through the vent opening of the manhole cover and wherein the stem is configured to attach to the valve body such that when the stem is disposed within the vent opening, the valve body is aligned with the vent opening and secured to the manhole cover.

13. A method of forming a vented precipitation guarding manhole cover assembly, the method comprising:
    forming a vent opening through a manhole cover between a top and bottom surfaces of the manhole cover;
    providing a valve assembly which includes providing a valve body, the valve body having a top surface with a first opening formed on the top surface, a bottom surface, a side surface extending between the top and bottom surfaces with a second opening formed on the side surface, and a fluid passageway extending between the first and second openings, the valve assembly operable between an open position, to enable gas to exit from a manhole and through the manhole cover, and a closed position, to prevent a flow of a fluid from the top surface through the manhole cover into the manhole;

wherein, when the valve assembly is in the open position, gases within the manhole enter through the first opening and exit through the second opening, and, when in the closed position, the fluid is prevented from entering the manhole through the first opening; and securing the valve assembly to the manhole cover such that the valve assembly extends from the bottom surface and into the manhole when the manhole cover is positioned to enclose the manhole.

14. The method of claim 13, wherein securing the valve assembly to the manhole cover includes aligning the first opening with the vent opening.

15. The method of claim 13, wherein securing the valve assembly to the manhole cover includes threadably securing the valve assembly to the manhole cover.

16. The method of claim 13, further comprising providing a protrusion member and securing the protrusion member to the manhole cover such that it extends from the top surface and a vent opening in the protrusion member is aligned with the vent opening of the manhole cover.

17. The method of claim 16, wherein providing the protrusion member includes providing a stem extending from the protrusion member, the stem sized to fit within and extend through the vent opening of the manhole cover, the method further including securing the valve assembly to the stem.

* * * * *